(12) United States Patent
Barlier et al.

(10) Patent No.: US 7,607,211 B2
(45) Date of Patent: Oct. 27, 2009

(54) DEVICE FOR PRODUCING PLATES DESIGNED FOR A FAST PROTOTYPING PROCESS, METHOD FOR MACHINING AND ASSEMBLING SAID PLATES AND RESULTING PLATES AND PROTOTYPE WORKPIECES

(75) Inventors: Claude Barlier, Coinches (FR); Alain Wadsworth, Ban de Laveline (FR)

(73) Assignee: Centre d'Ingéniérie de Recherche et de Transfert de l'ESSTIN à Saint Die (C.I.R.T.E.S.), Saint Die (FR)

( * ) Notice: Subject to any disclaimer, the term of this patent is extended or adjusted under 35 U.S.C. 154(b) by 555 days.

(21) Appl. No.: 10/276,217

(22) PCT Filed: May 14, 2001

(86) PCT No.: PCT/FR01/01445

§ 371 (c)(1),
(2), (4) Date: Apr. 2, 2003

(87) PCT Pub. No.: WO01/87574

PCT Pub. Date: Nov. 22, 2001

(65) Prior Publication Data

US 2003/0145445 A1 Aug. 7, 2003

(51) Int. Cl.
B23P 13/04 (2006.01)
B23P 23/04 (2006.01)
B28B 7/14 (2006.01)

(52) U.S. Cl. .................. 29/557; 29/33 R; 29/421.1; 29/527.1; 29/559; 264/163; 249/78; 249/79

(58) Field of Classification Search .............. 29/33 R, 29/527.1, 527.6, 527.7, 557, 559, 421.1; 249/78, 79; 264/163
See application file for complete search history.

(56) References Cited

U.S. PATENT DOCUMENTS

| | | | | |
|---|---|---|---|---|
| 2,428,658 A | * | 10/1947 | Falk et al. | 249/82 |
| 2,477,060 A | * | 7/1949 | Hudak | 249/170 |
| 2,479,191 A | * | 8/1949 | Williams et al. | 249/79 |

(Continued)

FOREIGN PATENT DOCUMENTS

DE 3711470 10/1988

(Continued)

OTHER PUBLICATIONS

Bocking et al., Electrochemical Routes For Engineering Tool Production, The GEC Journal of Technology, vol. 14, 1997.*

(Continued)

*Primary Examiner*—Essama Omgba
(74) *Attorney, Agent, or Firm*—Gary M. Cohen

(57) ABSTRACT

A device for producing plates made of metal, plastic or a metallo-plastic composite material, including thermofusible, thermoplastic and thermosettable materials, by machining with a machining tool in a fast prototyping process, includes a plate mold integrated in the prototyping machine. The mold is adapted to receive a material matching the shape of the mold, and to subject the plate to a heating/cooling cycle using a heating/cooling device integrated in the mold body, and additionally includes a vat (2), a base plate (3), a heating circuit (4) and a fluid circulation circuit (5).

31 Claims, 1 Drawing Sheet

U.S. PATENT DOCUMENTS

| | | | | |
|---|---|---|---|---|
| 2,615,111 | A * | 10/1952 | Paquette et al. | 83/170 |
| 3,039,146 | A * | 6/1962 | Engel | 249/79 |
| 3,369,272 | A * | 2/1968 | Martin, Jr. et al. | 425/525 |
| 3,612,387 | A | 10/1971 | Rathbun | |
| 3,790,152 | A | 2/1974 | Parsons | |
| 3,932,923 | A | 1/1976 | DiMatteo | |
| 4,001,069 | A | 1/1977 | DiMatteo | |
| 4,250,727 | A * | 2/1981 | Baril et al. | 72/46 |
| 4,338,068 | A * | 7/1982 | Suh et al. | 425/144 |
| 4,586,690 | A * | 5/1986 | Hartel et al. | 249/78 |
| 4,601,652 | A * | 7/1986 | Ando et al. | 425/447 |
| 4,675,825 | A | 6/1987 | DeMenthon | |
| 4,752,352 | A | 6/1988 | Feygin | |
| 4,781,555 | A * | 11/1988 | Cook | 425/4 R |
| 5,015,312 | A | 5/1991 | Kinzie | |
| 5,031,483 | A | 7/1991 | Weaver | |
| 5,354,414 | A | 10/1994 | Feygin | |
| 5,514,232 | A | 5/1996 | Burns | |
| 5,663,883 | A | 9/1997 | Thomas et al. | |
| 5,725,891 | A * | 3/1998 | Reid, Jr. | 425/407 |
| 5,765,137 | A | 6/1998 | Lee | |
| 5,775,402 | A | 7/1998 | Sachs et al. | |
| 5,776,409 | A | 7/1998 | Almquist et al. | |
| 5,793,015 | A | 8/1998 | Walczyk | |
| 5,812,402 | A | 9/1998 | Makiuchi et al. | |
| 5,847,958 | A | 12/1998 | Shaikh et al. | |
| 5,943,240 | A * | 8/1999 | Nakamura | 700/197 |
| 6,110,409 | A * | 8/2000 | Allanic et al. | 264/401 |
| 6,136,132 | A | 10/2000 | Kinzie | |
| 6,164,115 | A * | 12/2000 | Higuchi et al. | 72/452.9 |
| 6,276,656 | B1 * | 8/2001 | Baresich | 249/79 |
| 6,284,182 | B1 * | 9/2001 | McNally | 264/306 |
| 6,324,438 | B1 | 11/2001 | Cormier et al. | |
| 6,344,160 | B1 * | 2/2002 | Holtzberg | 264/102 |
| 6,358,029 | B1 * | 3/2002 | Niimi | 425/107 |
| 6,405,095 | B1 * | 6/2002 | Jang et al. | 700/118 |
| 6,409,902 | B1 * | 6/2002 | Yang et al. | 205/70 |
| 6,454,924 | B2 | 9/2002 | Jedrzejewski et al. | |
| 6,544,024 | B1 * | 4/2003 | Yim | 425/144 |
| 6,554,882 | B1 * | 4/2003 | Zhou et al. | 75/228 |
| 6,617,601 | B1 * | 9/2003 | Wiklund | 250/559.29 |
| 6,627,030 | B2 * | 9/2003 | Yang et al. | 156/250 |
| 6,627,835 | B1 | 9/2003 | Chung et al. | |
| 6,688,871 | B1 * | 2/2004 | Lee et al. | 425/129.1 |
| 6,719,554 | B2 * | 4/2004 | Hobson | 425/289 |
| 6,745,446 | B1 * | 6/2004 | Barlier | 29/412 |
| 6,921,068 | B2 * | 7/2005 | Barlier et al. | 269/7 |
| 6,991,021 | B2 * | 1/2006 | Ramirez et al. | 164/103 |
| 7,003,864 | B2 * | 2/2006 | Dirscherl | 29/527.2 |
| 2002/0125613 | A1 * | 9/2002 | Cominsky | 264/401 |
| 2002/0149137 | A1 | 10/2002 | Jang et al. | |
| 2002/0162940 | A1 * | 11/2002 | Frul et al. | 249/79 |
| 2002/0165634 | A1 * | 11/2002 | Skszek | 700/118 |
| 2003/0006001 | A1 | 1/2003 | Yang et al. | |
| 2003/0122277 | A1 * | 7/2003 | Padovani | 264/163 |
| 2003/0141609 | A1 * | 7/2003 | Jia | 264/39 |
| 2004/0173930 | A1 * | 9/2004 | Himmer et al. | 264/163 |
| 2004/0173951 | A1 * | 9/2004 | Hobson | 264/536 |
| 2004/0217497 | A1 * | 11/2004 | Engwall et al. | 264/40.1 |

FOREIGN PATENT DOCUMENTS

| | | | |
|---|---|---|---|
| DE | 4041105 | | 6/1992 |
| EP | 0585502 | | 3/1994 |
| EP | 0606627 | | 7/1994 |
| EP | 0655317 | | 5/1995 |
| EP | 0655668 | | 5/1995 |
| EP | 0738583 | | 10/1996 |
| EP | 0763417 | | 3/1997 |
| EP | 0811457 | | 12/1997 |
| EP | 920946 | A2 * | 6/1999 |
| FR | 2233137 | | 1/1975 |
| FR | 2625135 | A1 * | 6/1989 |
| FR | 2673302 | | 8/1992 |
| FR | 2750064 | | 12/1997 |
| FR | 2789187 | | 8/2000 |
| FR | 2789188 | | 8/2000 |
| FR | 2808896 | | 11/2001 |
| FR | 2809040 | | 11/2001 |
| FR | 2834803 | | 7/2003 |
| FR | 2845492 | | 4/2004 |
| GB | 2011814 | | 7/1979 |
| WO | WO/9112120 | | 8/1991 |
| WO | WO/9508416 | | 3/1995 |
| WO | WO/9900234 | | 1/1999 |
| WO | WO 99/11832 | * | 3/1999 |
| WO | WO/0222341 | | 3/2002 |

OTHER PUBLICATIONS

Patent Abstracts of Japan, vol. 016, No. 370 (M-1292) Published: Aug. 10, 1992 (pertaining to JP 04 118221 (Fujitsu Ltd.), published Apr. 20, 1992).

Patent Abstracts of Japan, vol. 1995, No. 11 Published: Dec. 26, 1995 (pertaining to JP 07 214274 (U Mold:KK), published Aug. 15, 1995).

T. Himmer et al. "Lamination of Metal Sheets" Computers in Industry, Elsevier Science Publishers, Amsterdam, Netherlands, vol. 39, No. 1, pp. 27-33 (Jun. 1999).

T. Polito, "Comment Optimiser le Moulage des Plastiques", ("How to Optimize the Molding of Plastics"), Emballages Magazine, Jan.-Feb. 2002, Supplement No. 605, pp. 56 and 57.

Choi et al "Desion and Evaluation of a Laser-Cutting Robot for Laminated, Solid Freeform Fabrication", Proceedings of the 2000 IEEE International Conference on Robotics & Automation, San Francisco, CA (Apr. 2000).

* cited by examiner

DEVICE FOR PRODUCING PLATES DESIGNED FOR A FAST PROTOTYPING PROCESS, METHOD FOR MACHINING AND ASSEMBLING SAID PLATES AND RESULTING PLATES AND PROTOTYPE WORKPIECES

BACKGROUND OF THE INVENTION

The present invention relates to a device for producing plates made of metal, plastic or a metallo-plastic composite, including, for example, thermofusible, thermoplastic or thermosetting materials, and more particularly, to the machining of such materials by a machine tool in a rapid prototyping process. The present invention also relates to a method for machining and assembling thermofusible plates, for producing prototype parts, and the products obtained.

In general, the present application will make reference to a rapid prototyping process which is known by the name "STRATOCONCEPTION" (a registered trademark), and which is disclosed, for example, in the commonly owned European Patent No. 0 585 502-B1. Reference will also be made to the commonly owned French Patent Applications No. 98 14687 and No. 98 14688.

In general, the "STRATOCONCEPTION" process can be used to produce mechanical parts and items, particularly prototypes, from a specific computer-aided design. This is achieved by the successive steps of performing a virtual breakdown of the part to be produced into elementary laminates, placed in an array, manufacturing a plurality of elementary laminates or layers, building up the plurality of manufactured layers, and assembling the layers to form the part to be produced. The laminates originate from a prior breakdown of the part on predetermined planes, and in one or more determined steps.

The underlying principle is that the volume of the part to be reproduced, as a prototype, is broken down into a multitude of laminates. The laminates are produced by machining, for example, by the rapid micromilling of a material in plate or sheet form. The material to be used can, for example, be made of wood, a composite, plastic or metal.

Irrespective of which of these materials is selected for use, there is necessarily a significant loss of material. While this is not in itself prohibitive in carrying out the process, it is nonetheless detrimental to the economy of the process because chips and offcuts of material, and the milling residue produced, cannot be used.

There is, therefore, a need for a machining process that permits the machining of a material, and that permits recycling of the residue from the machined material, as well as machined parts that are of an unsatisfactory quality or that no longer have any use.

SUMMARY OF THE INVENTION

In accordance with the present invention, this is achieved with a device for producing plates made of metal, plastic or a metallo-plastic composite, including, for example, thermofusible, thermoplastic or thermosetting materials, which can be machined by a machine tool in a rapid prototyping process. To this end, a plate mold is incorporated into the prototyping machine which is capable of receiving a material that hugs the shape of the mold, having been subjected to a heating/cooling cycle by a heating/cooling device incorporated into the body of the mold.

The material used for implementing this can be in the form of a liquid, granules or a solid element. The material can be thermofusible, or can be a thermoplastic or a thermosettable material. For thermoplastic materials, the heating/cooling process will be reversible. For materials in the form of granules, the process will include a phase of plasticizing, by heat, and compression or injection.

It will be understood that the improvements of the present invention will find application for any material which can, within a reasonable temperature range, pass from a liquid state to a solid state, possibly reversibly.

An important feature of the present invention is that the machining of plates in the form of a laminate or a collection of laminates placed in an array will be performed directly in the mold. Chips generated by the machining are collected, and can be recycled. The part is held in the mold, in the cold state, and is released from the mold by the slight heating of lower portions of the part, sufficient to detach the part from the bottom of the mold.

Compared to prior processes and devices, the apparatus of the present invention allows greater ease of material supply. The apparatus of the present invention also allows the automation of the overall prototyping process to be optimized.

The invention will be better understood with reference to the description which follows, together with the following drawings.

DETAILED DESCRIPTION OF THE INVENTION

Figure 1:
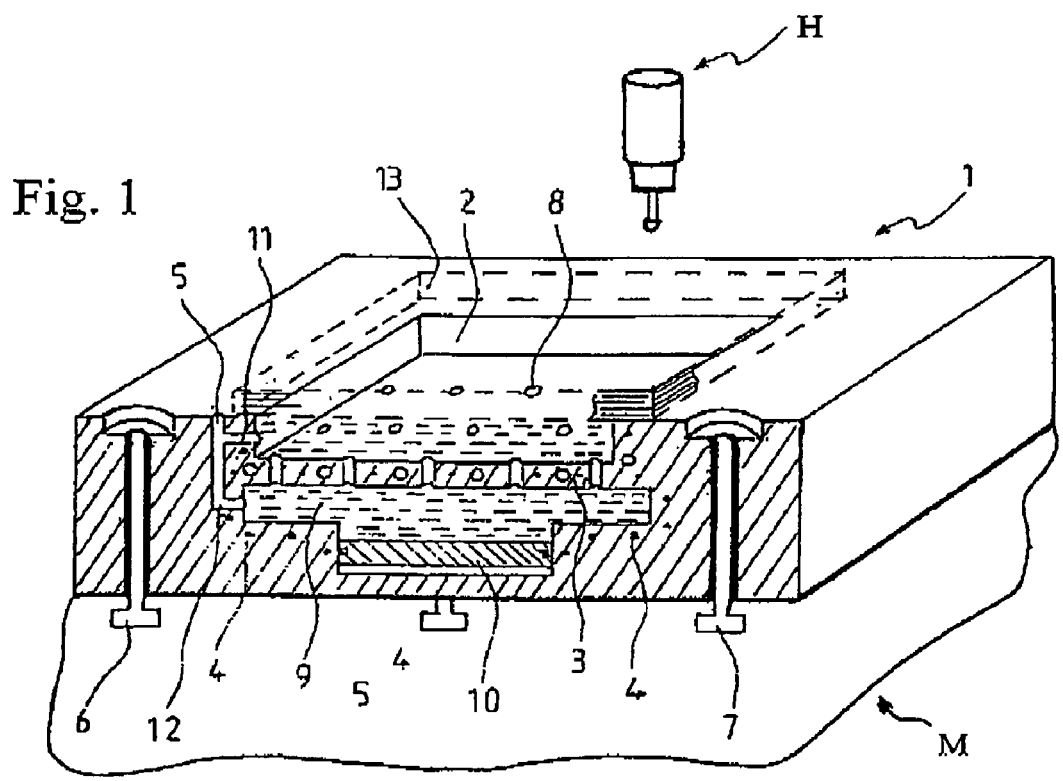
FIG. 1 is a schematic, isometric view, in partial cross-section, of a device of the present invention.

Referring to FIG. 1, the device (1) of the present invention comprises a tank (2), a baseplate (3), a heating circuit (4) and a fluid-circulation circuit (5). The device (1) is fitted, for example, by nuts (6, 7) onto a flat surface, for example, the bed of a machine tool (M), beneath a head (H) for machining a plate or part which is to be received and retained in position on the machine tool (M) by the device (1) as will be described more fully below. The head (H), the machine tool (M) and their manner of operation in a rapid prototyping process are known, for example, from the above-referenced European Patent No. 0 585 502-B1, and French Patent Applications No. 98 14687 and No. 98 14688.

The bottom of the tank (2) includes a perforated plate (3). Resistive heating elements (4) and fluid-circulating tubes (5) pass longitudinally through the perforated plate (3). Perforations (8) are formed transversely in the plate (3) and place the free face of the tank (2) in communication with a lower reservoir of fluid (9).

Movement of the fluid is controlled by a piston (10), which can operate responsive to compressed air or any other functionally equivalent mechanical system compatible with the conditions of use. A retractable top plate (13) can temporarily close the mold while the material is being injected or during the curing phase.

In an alternative embodiment, use of the plate (13) for closing the mold can be circumvented. The material will then extend beyond the upper plane of the mold. Leveling is performed by skimming, for example, using the milling device which is already in place on the rapid prototyping station, or using any other scraping method. Excess liquid is removed through vents (11, 12) placed, for example, in the upper part of the mold. As other possible alternative embodiments, the cooling passages can act as a network for circulating a heating fluid, and the feed ducts can be situated only on lateral parts of the mold to make the ducts easier to break off as the laminate is extracted.

The basic principle of the present invention is the production of plates which can be ejected after cooling, possibly by a suitable piston system. Numerous alternative embodiments can be anticipated without departing from the scope of the present invention.

Figure 2:
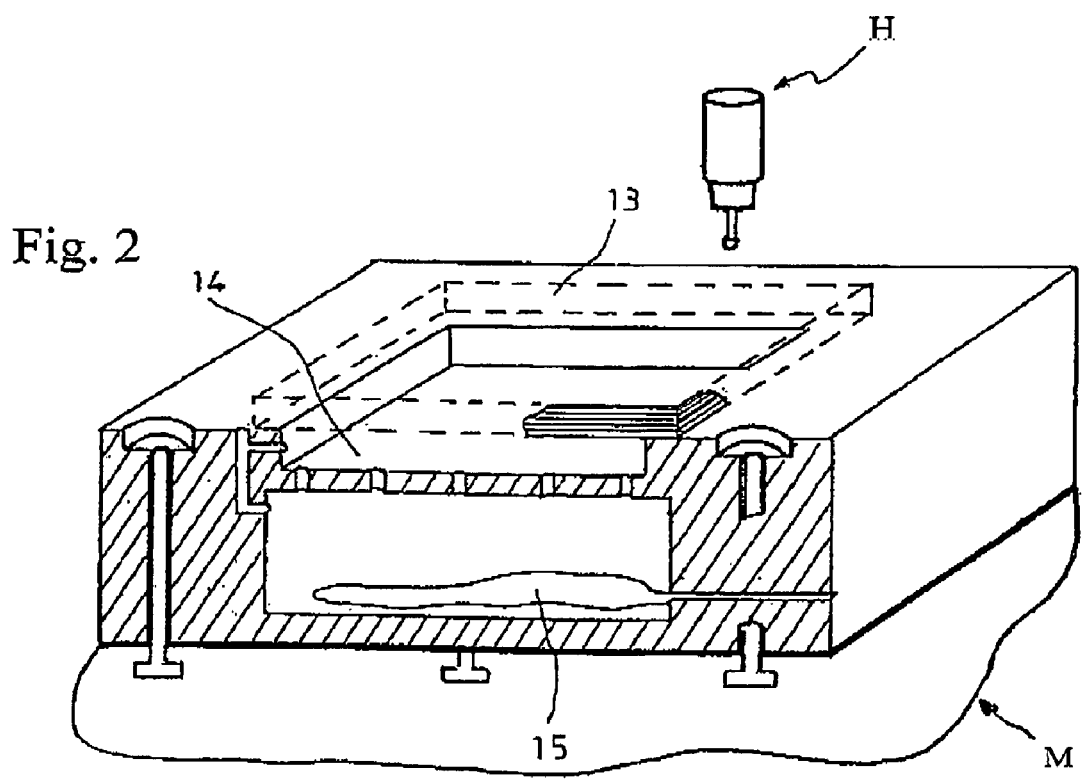
FIG. 2 is an alternative embodiment of the device shown in FIG. 1.

For example, as shown in FIG. 2, the retractable upper plate (13) allows the injection of a plate or a part (14). Ejection is managed by pneumatic and/or mechanical means (15) which will eject the part (14) after slight heating. The tank, or the actual cavity of the mold, will facilitate mold release and extraction of the part (14). The plate (14), which has remained solid, can also be ejected by once again liquefying the plastic in the reservoir.

The invention claimed is:

1. A device for producing plates in a rapid prototyping process, wherein the plates are machined by a machine tool of a prototyping machine, and wherein the device comprises:
   a plate mold incorporated in the prototyping machine and having a defined shape, wherein the prototyping machine includes the machine tool, wherein the mold is configured to receive a material selected from the group of materials consisting essentially of metals, plastics and metallo-plastic composites, including thermofusible, thermoplastic and thermosettable materials, in a shape that hugs the shape of the mold, and wherein the mold has a body which incorporates a heater and a cooling device for subjecting a plate to a heating and cooling cycle.

2. The device of claim 1 which further includes a tank formed in the body of the mold, a baseplate associated with bottom portions of the tank, and a heating circuit and a fluid-circulating circuit associated with bottom portions of the body of the mold.

3. The device of claim 2 wherein the bottom portions of the tank include a perforated plate.

4. The device of claim 3 wherein resistive heating elements and fluid-circulating tubes pass longitudinally through the perforated plate.

5. The device of claim 3 wherein the perforated plate includes perforations extending transversely through the perforated plate, and wherein the perforations place a free face of the tank in communication with a lower reservoir of fluid provided in the body of the mold.

6. The device of claim 2 wherein the fluid-circulating circuit includes a piston for controlling movement of the fluid.

7. The device of claim 2 wherein the fluid-circulating circuit includes a pneumatic device for controlling movement of the fluid.

8. The device of claim 1 which further includes a retractable top plate for temporarily closing the mold.

9. The device of claim 1 wherein the shape of the mold for receiving the material includes surface portions which are open to exterior portions of the mold.

10. The device of claim 1 wherein the plates are machined while in a solid state.

11. The device of claim 10 wherein the plates are machined directly in the mold.

12. The device of claim 11 wherein the plates are milled directly in the mold.

13. The device of claim 10 wherein the plates are released from the mold after being machined.

14. The device of claim 13 wherein the plates are ejected from the mold after being machined.

15. A process for machining a plate constituting a laminate for a collection of laminates placed as an array in a rapid prototyping process defined by a computer-aided breakdown of a part into the laminates, comprising the steps of:
   machining the plate in a mold incorporated in a rapid prototyping machine, wherein the mold has a defined shape, and wherein the mold receives material for producing the plate in a shape that hugs the shape of the mold; and
   subjecting the machined plate to a heating and cooling cycle while in the mold.

16. The process of claim 15 which further includes the step of forming the plate of a material selected from the group of materials consisting essentially of metals, plastics and metallo-plastic composites which are capable of changing from a liquid phase to a solid phase.

17. The process of claim 15 which further includes the step of forming the plate of a material selected from the group consisting essentially of thermosettable and thermoplastic materials.

18. The device of claim 9 wherein the surface portions are exposed to the machine tool during the machining of the material received in the mold.

19. The device of claim 18 wherein the exposed surface portions receive the machine tool during the machining of the material received in the mold.

20. The device of claim 18 wherein the machine tool is separate from the mold.

21. The device of claim 18 wherein the machine tool is positioned over the mold.

22. The process of claim 15 wherein the shape of the mold for receiving the material includes surface portions which are open to exterior portions of the mold, and wherein the process further includes the step of exposing the open surface portions to a machine tool during the machining of the plate.

23. The process of claim 22 which further includes the step of machining the exposed surface portions with the machine tool during the machining of the plate.

24. The process of claim 23 wherein the machine tool is separate from the mold.

25. The process of claim 15 which further includes the steps of heating the material for producing the plate, following the machining, and ejecting the machined plate from the mold following the heating.

26. The process of claim 15 wherein the heating and cooling cycle includes the steps of holding the plate in the mold in a cold state during the machining, and releasing the machined plate from the mold by heating lower portions of the plate sufficient to detach the plate from the mold after the machining.

27. The process of claim 15 which further includes the step of machining the plate while in a solid state.

28. The process of claim 27 which further includes the step of machining the plate directly in the mold.

29. The process of claim 28 which further includes the step of milling the plate directly in the mold.

30. The process of claim 27 which further includes the step of releasing the plate from the mold after being machined.

31. The process of claim 30 which further includes the step of ejecting the plate from the mold after being machined.

* * * * *